United States Patent [19]

Vaguine et al.

[11] 3,940,051
[45] Feb. 24, 1976

[54] BONDING OF FERRITE TO METAL FOR HIGH-POWER MICROWAVE APPLICATIONS

[75] Inventors: Victor A. Vaguine, Palo Alto; Dennis R. Nichols, San Jose, both of Calif.

[73] Assignee: Varian Associates, Palo Alto, Calif.

[22] Filed: Oct. 8, 1974

[21] Appl. No.: 513,195

Related U.S. Application Data

[62] Division of Ser. No. 337,059, March 1, 1974, Pat. No. 3,873,944.

[52] U.S. Cl. .................................................. 228/208
[51] Int. Cl.² ............................................... B23K 1/20
[58] Field of Search ...... 29/492, 488, 484; 228/208, 228/214, 203

[56] References Cited
UNITED STATES PATENTS
3,372,471   3/1968   Kuhn .................................. 29/492 X Primary Examiner—Al Lawrence Smith
Assistant Examiner—Margaret Joyce
Attorney, Agent, or Firm—Stanley Z. Cole; L. F. Herbert; John J. Morrissey

[57] ABSTRACT

A ferrite-to-metal bond suitable for the environment of a high-power microwave circulator is disclosed. The bonding surface of a gyromagnetic ferrite or garnet button is metallized by a sputtering process that deposits successive layers of nichrome, copper and gold thereon. During the sputtering process, a flexible stainless steel band surrounds the button to prevent sputtered material from being deposited on other than the bonding surface of the button. The metallized bonding surface is then soldered to a metal wall of the circulator. The bond so formed is capable of withstanding a peak power level in the circulator of 2.0 megawatts and an average power level of 3.5 kilowatts under standing-wave conditions.

11 Claims, 6 Drawing Figures

U.S. Patent   Feb. 24, 1976   3,940,051
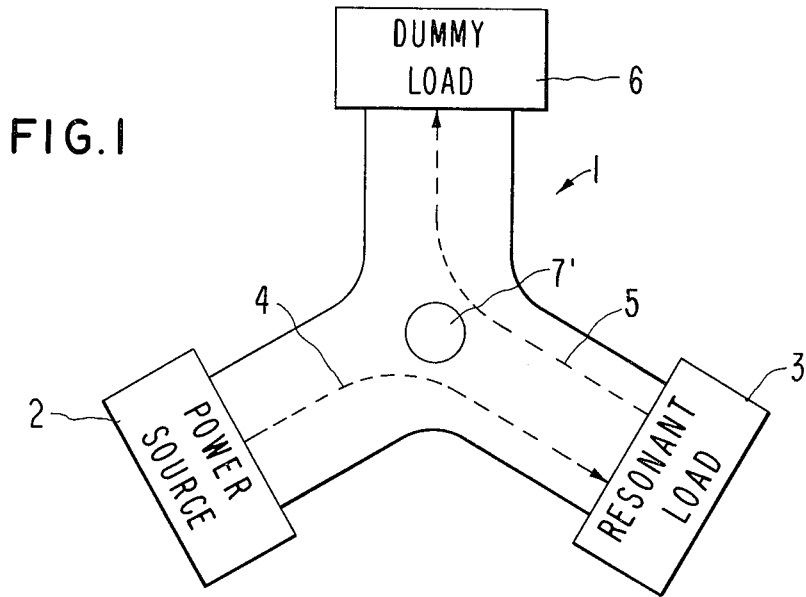
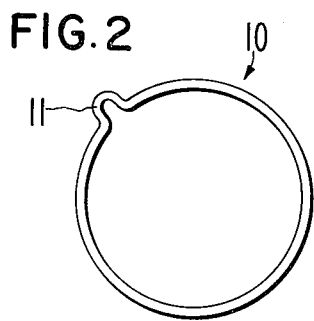
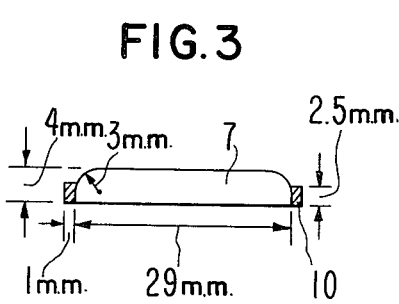
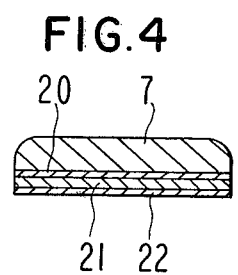
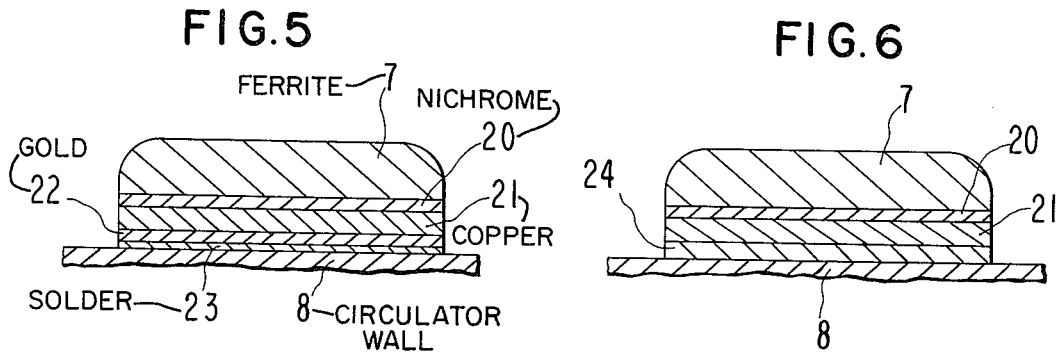

BONDING OF FERRITE TO METAL FOR HIGH-POWER MICROWAVE APPLICATIONS

This is a division of application Ser. No. 337,059 filed 3/1/73, now U.S. Pat. No. 3,873,944.

BACKGROUND OF THE INVENTION

1. Field of the Invention

This invention is a further development in the high-power microwave art, and in particular provides a ferrite-to-metal bond that will tolerate standing-wave conditions in a microwave circulator for an extended length of time.

2. Description of the Prior Art

One method for achieving non-reciprocal transmission of power in a microwave system is by means of a circulator having a pair of symmetrically disposed gyromagnetic ferrite or garnet buttons mounted therein to concentrate the flux lines of an externally produced magnetic field. Interaction of the microwave with the externally magnetized gyromagnetic ferrite or garnet buttons will cause transmission of the microwave power only in a particular direction. Prior to the present invention, such ferrite or garnet buttons had been bonded to opposing metal walls of a circulator by a dielectric bonding material such as an epoxy or a mixture of epoxies. It has been found, however, that for high-power levels that are frequently encountered in microwave systems, dielectric bonding material is likely to melt, evaporate, bubble or boil out thereby causing the bond to fail. Until the present invention, a metallizing technique had not been developed which could provide a bond capable of withstanding high-power levels such as would occur under standing wave conditions caused by a frequency mismatch between, for example, a resonant linear accelerator load and a magnetron power source.

SUMMARY OF THE INVENTION

This invention provides a technique for metallizing a gyromagnetic ferrite or garnet button so that the button can be soldered to a wall of a microwave circulator, and thereupon function in a high-power environment within the circulator for an extended length of time without being fractured and without suffering diminution in its capacity to effect non-reciprocal transmission of microwave power. A sputtering process is utilized to metallize the button by depositing an adherent layer of nichrome onto the bonding surface of the button, and thereafter a layer of copper onto the nichrome layer, and finally a layer of gold onto the copper layer. During the sputtering process, a flexible stainless steel band surrounds the ferrite button to prevent sputtered material from being deposited on any portion of the button other than its bonding surface. Flexibility of the band is achieved by providing a scallop in the band.

BRIEF DESCRIPTION OF THE DRAWING

FIG. 1 shows in schematic form a microwave system comprising a three-port circulator having a pair of gyromagnetic ferrite buttons disposed to achieve non-reciprocal transmission of power.

FIG. 2 shows in plan view a stainless steel band as used in the sputtering process of this invention.

FIG. 3 shows the band of FIG. 2 surrounding a ferrite button, and indicates appropriate dimensions.

FIG. 4 shows a cross-sectional view of a ferrite button metallized according to the technique of this invention.

FIG. 5 shows a cross-sectional view of a ferrite button bonded to a metal wall according to the technique of this invention.

FIG. 6 shows a cross-sectional view of a ferrite button bonded to a metal wall by an alternative bond to the bond shown in FIG. 5--.

DESCRIPTION OF THE PREFERRED EMBODIMENT

In many microwave systems, power reflected from the working load cannot be tolerated by the power source. For example, where the working load is a resonant apparatus such as an electron accelerator and the power source is a magnetron, reflections of power from the accelerator can be caused by frequency mismatch between the accelerator and the magnetron and/or by transient processes inherent in pulsed operation of the accelerator. Even small power reflections from the accelerator will tend to drive the magnetron off frequency. If the magnetron is off frequency, all power will be reflected from the accelerator thereby causing further detuning of the magnetron. It is therefore necessary in such systems that the power source be isolated from the resonant load.

Reffering now to FIG. 1, a three-port circulator 1 is shown which isolates a power source 2, which may be a magnetron, from a resonant load 3, which may be a linear accelerator. Broken line 4 shows the direction of transmission of microwave power from the power source to the resonant load, and dotted line 5 shows the direction of transmission of power reflected from the resonant load to a dummy load 6. The power source is isolated from the resonant load because the circulator achieves non-reciprocal transmission of power within the circulator structure. A pair of gyromagnetic ferrite or garnet buttons, indicated by reference number 7', is disposed within the circulator structure. The wave generated by the power source interacts with the externally magnetized gyromagnetic ferrite or garnet buttons in such a way that power from the power source port of the circulator can be transmitted only in the direction of the resonant load port, as shown by broken line 4. Similarly, any power reflected from the resonant load can be transmitted only in the direction of the dummy load port, as shown by dotted line 5. The dummy load 6 is intended to absorb substantially all of the reflected microwave energy. Techniques exist for utilizing small reflections from the dummy load, which the ferrite buttons cause to be transmitted only in the direction of the power source port, in order to stabilize the frequency of the power source at the frequency of the resonant load. For example, see U.S. Pat. No. 3,714,592, assigned to Varian Associates, assignee of the present invention.

For low power levels of operation, i.e., where peak power remains below 1.7 megawatts and the average operating power level is below 2.0 kilowatts, the ferrite or garnet buttons can successfully be located in proper position within the circulator by the dielectric bonding technique of the prior art, which essentially involves bonding a button 7 to a wall of the circulator with an epoxy or a mixture of epoxies. It has been found, however, that for high power operation, dielectric bonding material is likely to melt, evaporate, bubble or boil out, thereby causing the bond to fail. Where the resonant load is an apparatus designed to operate at a sharply defined resonance frequency, even slight frequency mismatch between the power source and the resonant load can produce substantially total reflection of power, and can thereby cause a standing wave condition within the circulator. The occurrence of such standing waves must be anticipated in a microwave system that comprises, for example, a linear accelerator. Under standing wave conditions, the electric field strength will be double that of travelling wave conditions. The microwave power in the circulator under standing-wave conditions will therefore be four times higher than under travelling wave conditions. It has been found that dielectric bonding material cannot withstand power levels that are attained under such standing-wave conditions.

This invention provides a metallizing technique whereby a gyromagnetic ferrite or garnet button can be soldered to a wall of a microwave circulator. The bond formed by soldering a ferrite or garnet surface that has been metallized according to this invention to a wall of a microwave circulator has been shown experimentally to be capable of withstanding peak power levels as high as 2.0 megawatts and average power levels of 3.5 kilowatts for intervals of time in excess of 30 minutes under standingwave conditions. These experimental limitations are not due to any discovered or anticipated failure of the bond at the specified power levels, but rather represent merely the maximum available peak power limit (i.e., 2.0 megawatts) of the magnetron used in conducting the test and the maximum repetition rate of the modulator used which resulted in a maximum available average operating power of 3.5 kilowatts. It was determined that under identical experimental conditions, a dielectric bond will fail within 2 minutes at 2.0 kilowatts average power or if peak power rises above 1.7 megawatts under standing-wave conditions.

The metallizing approach was not an obvious solution to the high-power bonding problem. Gyromagnetic ferrites are known to undergo certain irreversible changes in their electromagnetic properties at soldering temperatures, i.e., at temperatures above 175°C. Consequently, it was to be anticipated that the soldering process might cause a ferrite button to lose its property of causing non-reciprocal transmission of power in a microwave circulator. Furthermore, in any metallizing process it is essential that the metal layer be permanently bonded to the bonding surface of the button so that the metal layer cannot be removed by flaking or otherwise in the high-temperature environment of high-power microwave operation. Such permanent bonding can generally be achieved only by a sputtering technique, where the particles of metallizing material are driven into the substrate surface with an average energy of 20 electron volts, whereupon the atoms of the metallizing layer form a common interstitial structure with the atoms of the substrate material. It has been found that unless a special masking technique is used, sputtered metallizing material will be deposited on portions of the ferrite button other than the bonding surface. In particular, the side edge of the button is likely to receive a relatively heavy coating of metallizing material. Where a metallized surface of the ferrite button is exposed to a microwave field, even where the "metallization" consists of only a discontinuous deposition of minute amounts of sputtered metal along the side edge of the button, the capacity of the ferrite to function as a non-reciprocal wave guide is significantly reduced. Furthermore, metallization of the side edge of the ferrite button appears to promote arcing between the button and the walls of the circulator. It is therefore essential that an appropriate masking technique be used during the sputtering operations.

A band of masking material covering the side edge of the ferrite button during the sputtering operation would serve as a mask to prevent the deposition of metal on the side edge surface. During sputtering, however, the surface temperature of the ferrite button will typically reach 250°C. at which temperature the coefficient of thermal expansion for ferrite is approximately $10 \times 10^{-6}$ per degree C. A band enclosing the ferrite button will either fracture the ferrite or be itself fractured, unless the band expands at substantially the same rate as the ferrite. Numerous masking materials exist which have coefficients of thermal expansion approximating that of ferrite. However, at sputtering temperatures such materials will fuse with the ferrite. Materials such as stainless steel, tungsten and tantalum will not fuse with ferrite at sputtering temperatures, but have coefficients of thermal expansion which vary so significantly from the coefficient of thermal expansion for ferrite that fracturing of either the ferrite button or the masking structure would seem inevitable during the sputtering process.

According to the present invention, a masking technique has been developed for metallizing the bonding surface of a ferrite button while protecting those surface portions of the button other than the bonding surface from the deposition of metallizing material. As shown in FIG. 2, a band 10 of 304-stainless steel tungsten or tantalum, having a scallop 11 in its periphery, has been found to provide adequate masking. The uneven rates of expansion of the ferrite and the band material with respect to each other can be accommodated by the scallop which allows the band to flex as the ferrite expands at a faster rate than the band. Typical dimensions for a ferrite button and for an appropriate stainless steel masking band are shown in FIG. 3. A ferrite button for use in a microwave circulator is typically in the form of a circular wafer having a diameter of approximately 29 millimeters and a thickness of approximately 4 millimeters. The side edge of the button is typically faired into the surface of the button which faces the microwave field. A typical radius of curvature for the convex portion of the continuously faired surface of the button is 3 millimeters. It has been found that a typical ferrite button will be adequately masked during the sputtering operation by a circular stainless steel band having a inner diameter just large enough to tightly accommodate the diameter of the button, an outer diameter approximately 1 millimeter larger than its inner diameter, and a scallop (as shown by reference number 11 in FIG. 2) extending radially outward about 5 millimeters beyond the outer diameter of the band with a separation of 2 millimeters between points on opposite sides of the scallop opening on the inner periphery of the band. A suitable thickness for the band is 2.5 millimeters. The stainless steel will not fuse with the ferrite button during the sputtering process, and will not fracture the button despite unequal coefficients of thermal expansion because of the springiness introduced into the band by the scallop. Tungsten or tantalum could be used in place of stainless steel, but stainless steel (and in particular 304-stainless) is especially preferred because of its mechanical workability.

Having developed a suitable masking technique, the choice of the particular metallizing maaterial or materials to use remains unobvious. The coefficients of thermal expansion for some materials typically used for microwave circulator structures are as follows: stainless steel, $16.4 \times 10^{-6}$ (°C)$^{-1}$; aluminum, $23 \times 10^{-6}$ (°C)$^{-1}$; and copper, $16 \times 10^{-6}$(°C)$^{-1}$; whereas the coefficient of thermal expansion for ferrite is only $10 \times 10^{-6}$(°C)$^{-1}$. The bond between the the ferrite button and the metal wall of the circulator must therefore be able to accommodate a relatively large difference between these coefficients of thermal expansion, without subjecting the button to such great mechanical stress that the button will be likely to fracture or to suffer displacement from its proper position within the circulator at high temperatures.

By a series of experiments, it has been found that a suitable metallizing bond can be formed by sputtering successive layers of nichrome, copper and gold onto the bonding surface of the ferrite button. FIG. 4 shows a ferrite button metallized according to the present invention. The ferrite button 7 has a layer of nichrome 20 sputtered onto its bonding surface, a layer of copper 21 sputtered onto the nichrome layer, and a layer of gold 22 sputtered onto the copper layer. The nichrome layer is approximately 10,000 angstroms thick. Nichrome is chosen because it forms a particularly strong oxide bond with ferrite or garnet. Other materials which form strong oxide bonds with ferrite or garnet and are suitable for this first sputtered layer include molybdenum and chromium.

Copper is chosen for the second sputtered layer because of its excellent thermal conductivity, which is important in removing heat from the button to the wall of the circulator during high-power microwave operation. In addition, copper will not be dissolved in the solder material during the soldering of the metallized button to the wall of the circulator. The copper layer is relatively thick, being about 30,000 angstroms.

A thin layer of gold, no more than 10,000 angstroms being necessary, is then sputtered onto the copper layer. Gold is chosen for the third sputtered layer because it is chemically inert. The purpose of the gold layer is to preclude oxidation of the copper layer. If an oxide were to form on the outer metallized layer of the button prior to soldering, the ability of the solder to wet the outer metallized layer would be seriously diminished and the bond formed by the solder would consequently be weakened. An oxide layer would also inhibit thermal conduction from the button to the wall of the circulator. The gold layer, therefore, serves as a protective coating on the copper layer. During soldering, the gold layer might dissolve, either partially or totally, depending upon the soldering temperature, into the solder material. This dissolving of the gold into the solder, however, is not harmful to the bond. It has been found that ordinary commercially available solder comprising a mixture of tin and lead is a satisfactory soldering material. A preferable soldering material would be indium, which has a better heat transfer capability and, being a softer material, provides better stress relief when cooling than a tin-lead mixture.

FIG. 5 shows a wall 8 of circulator 1, with a ferrite or garnet button 7 bonded thereto according to the technique of the invention. An analysis of the metallizing bond between the ferrite or garnet button and the circulator wall would reveal a first layer 20 comprising nichrome, molybdenum or chromium deposited upon the bonding surface of the button, a second layer 21 of copper, a third layer 22 of gold, and a fourth layer 23 comprising the solder material. The fourth layer might comprise a mixture of tin and lead, or it might be a layer of indium. To the extent that the gold has dissolved into the solder material, the fourth layer will also contain this dissolved gold. FIG. 6 shows a layer 24 sandwiched between the copper layer 21 and the wall 8 of the circulator. Layer 24 comprises the soldering material with the gold protective layer completely dissolved therein.

It is clear that changes could be made in particular details of the preferred embodiment of the invention disclosed herein without departing from the scope of the invention. Therefore, it is intended that the above description and the accompanying drawing be interpreted as illustrative only and not as limiting. The scope of this patent shall be limited only by the following claims:

What is claimed is:

1. A method of bonding a gyromagnetic ferrite button for causing nonreciprocal transmission of power within a microwave circulator to a metal wall of said circulator, said method comprising the steps of depositing a plurality of metal layers in succession upon a portion of said button and then soldering said metallized button to said metal wall.

2. The method of claim 1 wherein the step of depositing a plurality of metal layers in succession upon said button comprises the substep of depositing a first layer in contact with said button said first layer comprising a metal selected from the group consisting of nichrome, molybdenum and chromium; the substep of depositing a second layer comprising copper in contact with said first layer, and the substep of depositing a third layer comprising gold in contact with said second layer.

3. The method of claim 1 wherein said deposition of said plurality of metal layers is accomplished by sputtering.

4. The method of claim 1 wherein said soldering step comprises the step of soldering with indium.

5. The method of claim 1 wherein said soldering step comprises the step of soldering with a mixture of lead and tin.

6. A method of bonding a button for causing nonreciprocal transmission of power within a microwave circulator to a metal wall of said circulator, said method comprising the steps of masking a portion of the side surface of said button, sputter depositing a plurality of metal layers in succession upon the bonding surface of said button to metallize said portion of said button, and then soldering said metallized button to said metal wall.

7. the method of claim 6 wherein the step of masking a portion of the side surface of said button includes masking said side surface with a metal ring that substantially surrounds and covers the major portion of said side surface, said ring having a scallop in its periphery.

8. The method of claim 6 wherein the step of sputter depositing a plurality of metal layers in succession upon the bonding surface of said button includes depositing a first layer comprising a metal selected from the group consisting of nichrome, molybdenum and chromium, and depositing a second layer comprising copper.

9. The method of claim 8 wherein said step of depositing a plurality of metal layers in succession upon the bonding surface of said button further includes depositing a third layer comprising gold.

10. the method of claim 6 wherein the step of soldering said metallized button to said metal wall comprises soldering with indium.

11. The method of claim 6 wherein said step of soldering said metallized button to said metal wall comprises soldering with a mixture of lead and tin.

* * * * *